UNITED STATES PATENT OFFICE.

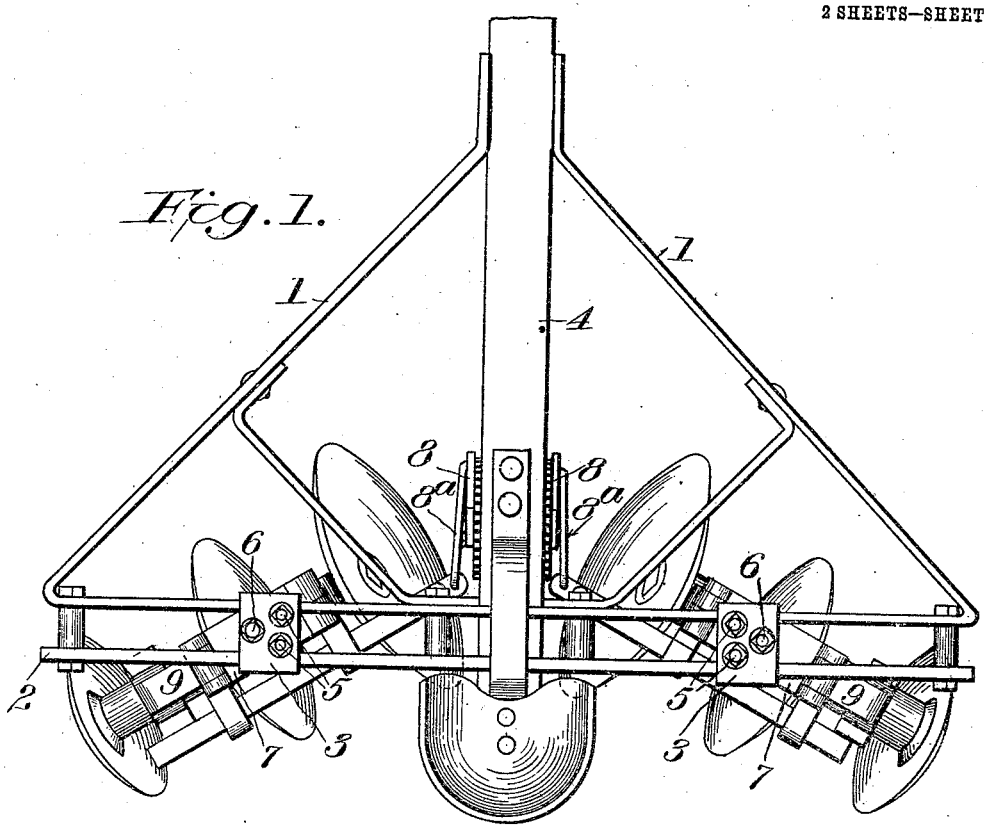
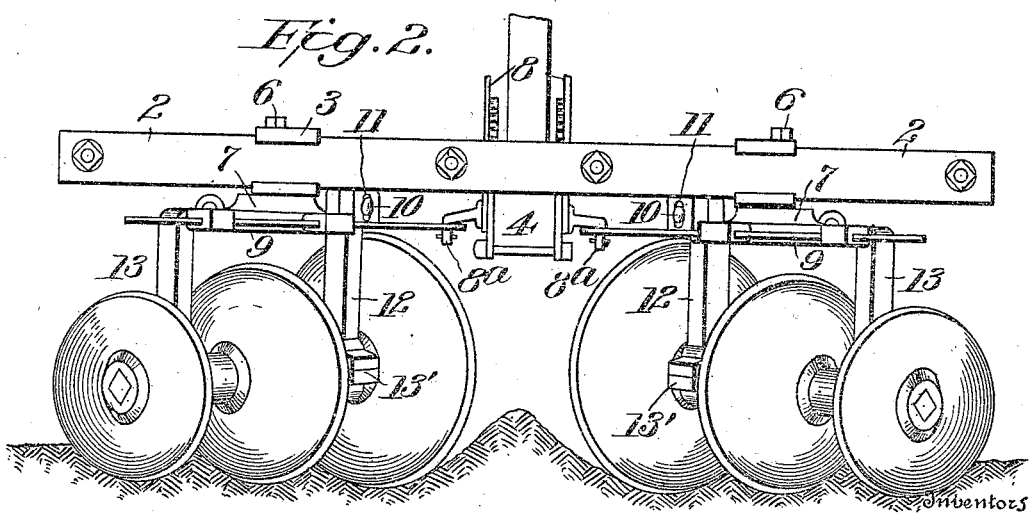

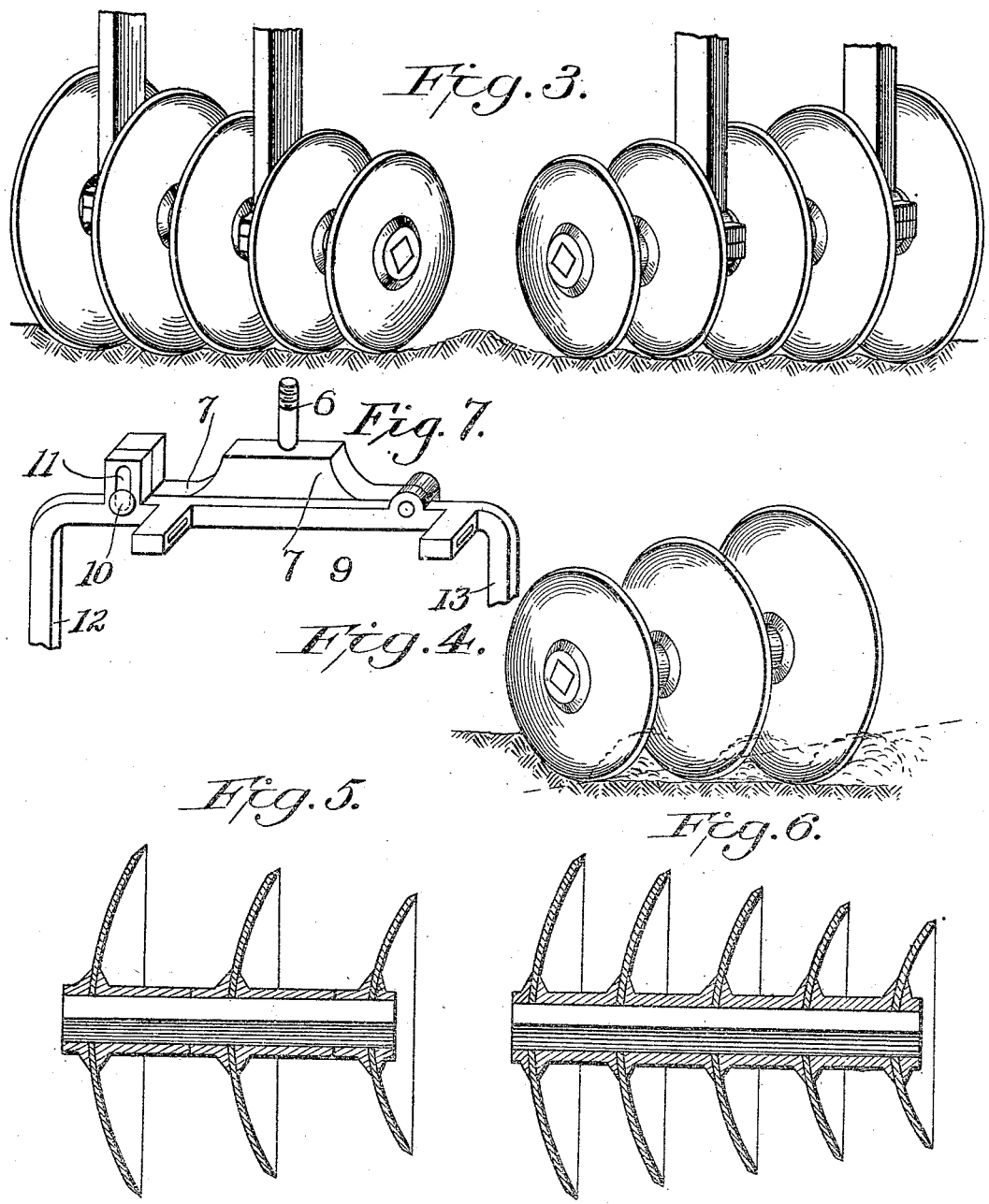

LEONARD KREBS AND CONRAD KREBS, OF SALEM, OREGON.

DISK PLOW.

959,356.  Specification of Letters Patent.  Patented May 24, 1910.

Application filed May 24, 1909. Serial No. 498,039.

*To all whom it may concern:*

Be it known that we, LEONARD KREBS and CONRAD KREBS, citizens of the United States, residing at Salem, in the county of Marion and State of Oregon, have invented certain new and useful Improvements in Disk Plows; and we do hereby declare the following to be a full, clear, and exact description of the invention, such as will enable others skilled in the art to which it appertains to make and use the same.

Our invention relates to disk plows in which a plurality of disks are mounted on each of two shafts, carried by a suitable frame. Each of these shafts is mounted on the frame so as to have rotary movement in a horizontal plane with respect thereto and is tilted in a vertical plane so that one end thereof is nearer the ground than the other. This arrangement of the shafts on an incline is necessary in order to make the disks enter the ground.

The main object of this invention is to do the combined work of an ordinary plow and harrow, that is turn the ground perfectly and pulverize the same in one operation by the use of our plow alone, whereby the cost of working the crops is reduced to about one-fourth of the cost of doing this work by the present method. Our plow is capable of doing any kind of plowing, but is especially designed for use in hopyards, vineyards and orchards, and for working all other kinds of farm products which are planted in rows, and which it is necessary to work by first plowing the soil from the rows to a ridge in the center and subsequently plow the soil back again after the plants have become further advanced. Our plow is, therefore, peculiarly fitted for throwing the soil either away from or toward the rows by simply reversing the shafts carrying the disks, that is, revolving said shafts until each is inclined in the opposite direction. For instance, if the shafts are arranged with their adjacent ends higher than their outer ends, and with their inner ends ahead of the outer ends and the disks facing inwardly the disk will throw the soil from the rows to the center, whereas if the inner ends of said shafts are lower than their outer ends, and the disks reversed, said disks will throw the soil from the middle to the rows.

The invention consists in the combination with oppositely inclined shafts arranged on converging lines transversely of the direction of progression of the plow, of dished or concave disks of graduated diameter and corresponding graduated dish or concavity mounted on said shafts at certain specified intervals, whereby said disks will enter the soil to the depth of an ordinary mold board plow, will turn the ground in the same manner as such a plow, and will also thoroughly pulverize the soil without clogging but insuring the disks " scouring," that is the soil coming out freely from between them. We have found that it is necessary to have the disks of graduated diameter in order to have them enter the ground to the same depth owing to the inclined positions of the shafts or axles. We have also discovered that in order to secure the desired results, the radius of curvature of the disks along each gang must increase in a fixed ratio from the smallest to the largest, or, in other words, their depths must vary in a fixed ratio with their diameters. For instance, where three disks are used on each shaft, they are made 20 in., 21 1/2 in. and 23 in. in diameter, and 2 1/2 in., 2 11/16 in. and 2 7/8 in. deep at their centers, respectively. We have also discovered that such an extreme dish or short radius of curvature as these dimensions give the disks can only be used when they are spaced from 7 to 10 inches apart, because if they are placed nearer together, they will not " scour " properly, while if they are placed farther apart, they will not completely turn the ground plowed, up. Actual tests have shown that our plow will turn four times as much ground at a depth of from 6 to 9 inches in one operation as it is possible to turn with the ordinary mold board plow, and that it will pulverize the soil so that it is unnecessary to run a harrow over it. The result is the saving of about three-fourths the expense which a farmer now incurs in doing the same work accomplished by our plow with the ordinary mold board plow and harrow. It will be noted that the deeper the disk is made, that is, the shorter its radius of curvature, the wider it will cut, the more ground it will turn over and the better it will pulverize the soil. When the plow is used for throwing the soil back from the center to the rows, a larger number of disks may be mounted on the axles for the reason that less space is required between the disks to let the pulverized soil come out than is necessary when the ground is first plowed up in the operation of plowing the soil from the rows to the center.

In the accompanying drawings illustrating the preferred embodiment of our invention; Figure 1 is a plan view of a plow constructed in accordance with our invention. Fig. 2 is a rear elevation thereof. Fig. 3 is a partial rear elevation illustrating the use of more disks in each gang. Fig. 4 is a detailed view of one of the gangs of disks showing how they all enter the ground at the same depth and how they turn over the soil like a mold board plow. Figs. 5 and 6 are central sectional views of gangs of three and five disks, respectively, illustrating particularly their relative diameters and depths, and Fig. 7 is an enlarged detail perspective view of the pivot plate and arm carrying one of the axles or shafts.

Referring more particularly to the drawings, 1 designates the frame of the plow which may be of any suitable form, preferably having a straight slotted beam 2, arranged transversely at the rear thereof. Mounted to slide in the slots in said beam are two adjustable blocks 3, arranged equidistant at opposite sides of the tongue 4. These blocks may be clamped at the desired distance from the center of the frame or tongue by means of bolts 5. Each block is also provided with a vertical pivot lug 6 which extends up through the same from a plate or casting 7, whereby the latter has rotary movement with respect to said block in a horizontal plane. These castings or plates are adapted to be revolved by hand levers 8 which are connected to said castings by rods 8ª.

Pivotally secured at one end of each of the plates or castings 7 is an arm 9 extending along said plate or casting and vertically adjustable thereon at its free end by means of a clamping bolt 10 engaging an elongated slot 11 in said plate. These arms are, therefore, capable of being adjusted at various angles in a vertical plane relative to the plates on which they are respectively mounted. Each of said arms carries two spaced apart standards or hangers 12 and 13, respectively. These hangers or standards depend vertically from their respective arms and have bearings 13′ at their lower ends for the shafts or axles 14. The hanger 13 of each pair is longer, that is, extends down farther than the hanger 12, so that the axle is inclined in a vertical plane when the arm is horizontal. It will be understood that any desired inclination of the axle may be had by varying the difference in the lengths of the two hangers 12 and 13 when the plow is constructed, and that any other necessary adjustments may be attained by changing the angle of said arm with respect to the plate on which it is mounted. It will further be noted that the angle of the axle with respect to the line of progression may be altered to suit the requirements by means of the hand levers 8.

Each axle carries a plurality of dished or concave disks comprising a gang. When the plow is to be used for turning hard or packed ground, we prefer to use three disks in each gang, as illustrated in Figs. 1, 2, 4 and 5. These three disks vary in diameter in the ratio of 20 inches for the smallest, 21 1/2 inches for the middle and 23 inches for the largest one. They also vary in depth in the ratio of 2 1/2 inches for the smallest, 2 11/16 inches for the middle and 2 7/8 inches for the largest one. In other words, 1/8 in. depth is added for each extra inch in diameter. The disks in the three-disk gangs are spaced from 7 to 10 inches apart. We have found that a spacing of nine inches gives about the best results for plowing ordinary soil.

It will be seen, particularly by referring to Fig. 4, that the difference in diameter of the disks makes them all enter the ground at the same depth so that each turns substantially the same amount of soil, although the larger disks will, of course, turn a little wider strip by reason of their greater diameter and the inclination of the axles to the line of progression or direction of movement of the plow. If the disks were all of the same diameter, as illustrated by the dotted line in Fig. 4, the one on the lower end of the axle would enter the ground several inches, while the one on the upper end thereof would hardly enter the ground at all. It will also be noted that if the disks of varying diameter had the same depth or dish only one of them, being the one having the proper ratio of depth and diameter, would properly turn and pulverize the soil.

In Figs. 3 and 6, we have illustrated five-disk gangs which are preferably used for working loose soil. The disks of these gangs vary in diameter from 19 inches to 23 inches, each being one inch larger than the next. The dish or depth of these disks vary from 2 inches on the disk which is 19 inches in diameter to 2 1/2 inches on the disk which is 23 inches in diameter, the depth of each disk being 1/8 inch greater for each extra inch in diameter. It will, therefore, be seen that the ratio of the depth with the diameter of the disks in the five-disk gang is the same as in the three-disk gang. In the former, however, the disks are arranged closer together than in the latter, say 5 or 6 inches apart, preferably six inches because they do not need so much space to let the loose soil come out and are not required to pulverize the soil to the same extent as are the three-disk gang in turning hard ground. As hereinbefore indicated, the three-disk gangs are especially designed for working farm products planted in rows, where it is desired to plow the soil from the rows to a ridge in the center, whereas, the five-disk gangs are used for throwing the soil back again from the ridge in the center to the rows after the plants have grown larger, see Figs. 2 and 3.

While it is essential to observe substantially the ratio and spacing specified herein, slight variations may be made without departing from the spirit or sacrificing the advantages of our invention.

We claim:

1. In a plow of the character described, the combination, with two axles arranged obliquely in vertical planes and oppositely inclined to the line of progression, of a plurality of concave disks mounted equi-distant apart on said axles, those on each axle being of graduated sizes and increasing in diameters and depths at the ratio of substantially one-eighth of an inch additional depth for each extra inch in diameter.

2. In a plow of the character described, the combination, with two axles arranged obliquely in vertical planes and oppositely inclined to the line of progression, of three concave disks mounted on each of said axles, the smallest one being twenty inches in diameter and two and one-half inches deep, the middle one twenty-one and one-half inches in diameter and two and eleven-sixteenths inches deep and the largest one twenty-three inches in diameter and two and seven-eighths inches deep, said disks being spaced nine inches apart on said axles for the purpose specified.

In testimony whereof, I, LEONARD KREBS affix my signature, in presence of two witnesses.

LEONARD KREBS.

Witnesses:
 LOUIS LACHMUND,
 L. R. KREBS.

In testimony whereof, I, CONRAD KREBS affix my signature, in presence of two witnesses.

CONRAD KREBS.

Witnesses:
 JOHN POE,
 E. E. THACKER.